Dec. 28, 1965     W. JONES ETAL     3,225,510
ARTICLE CARTONING MACHINE
Filed May 13, 1963     16 Sheets-Sheet 10
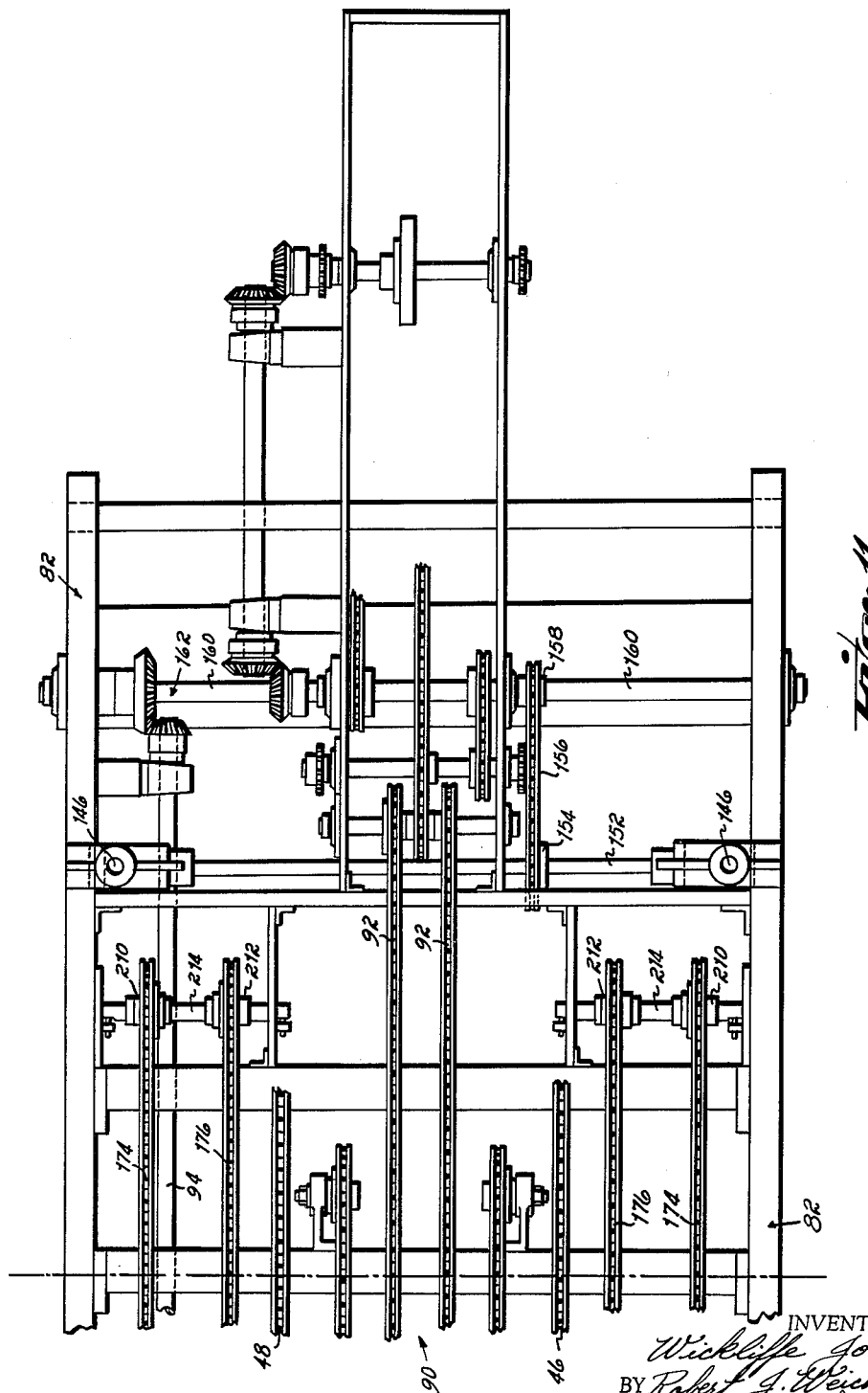
INVENTORS
Wickliffe Jones
Robert J. Weichhard
BY Wood, Herron and Evans
ATTORNEYS

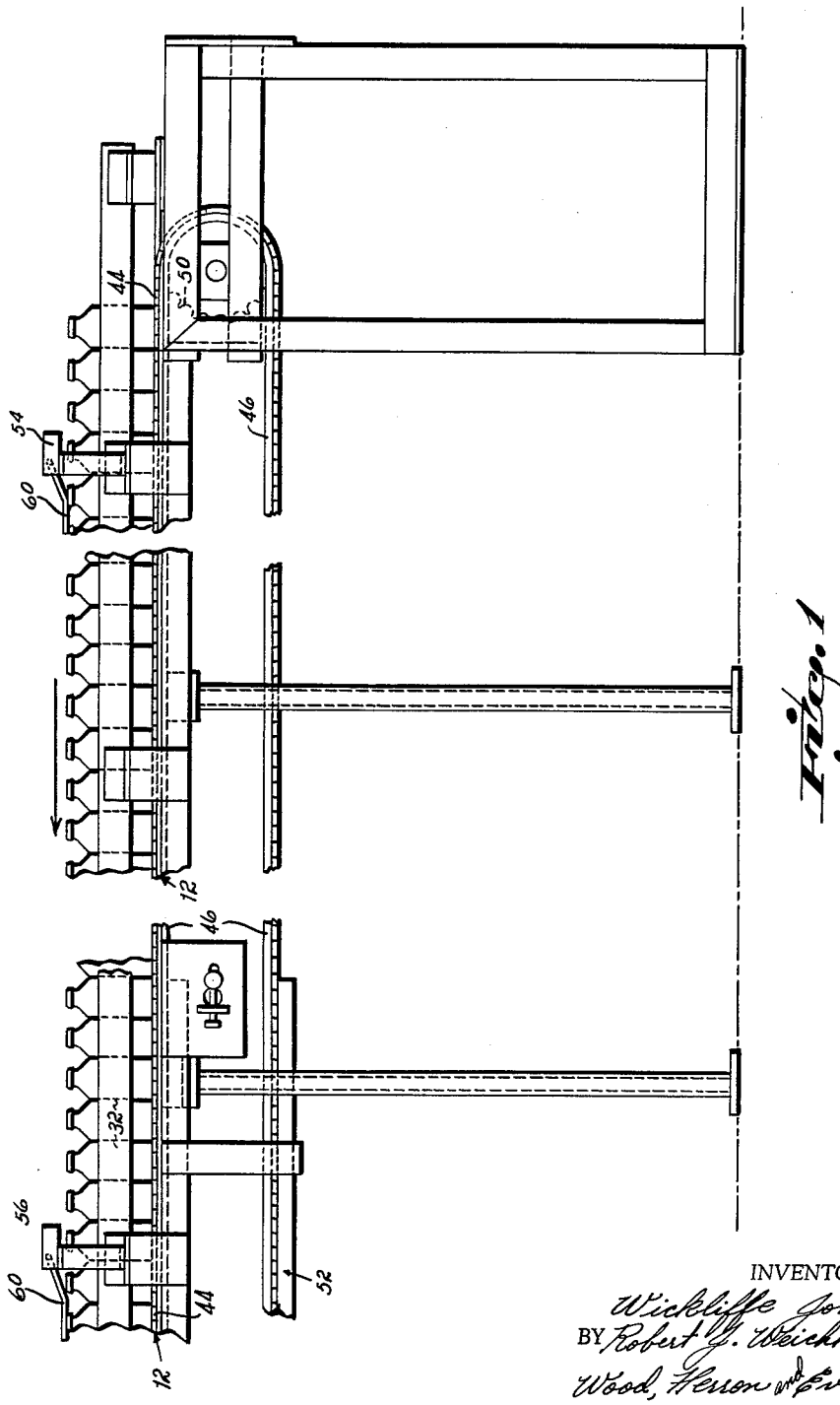

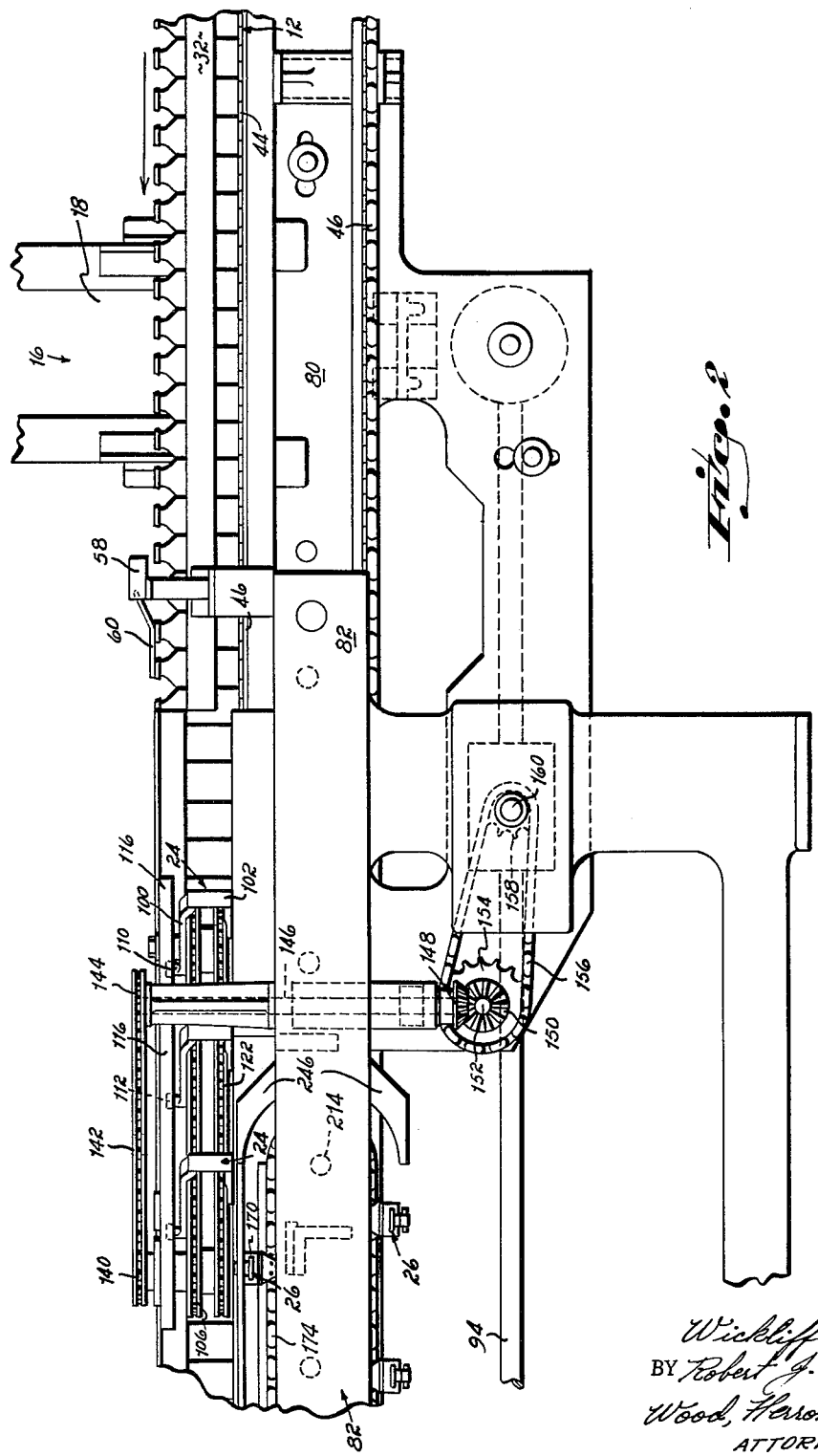

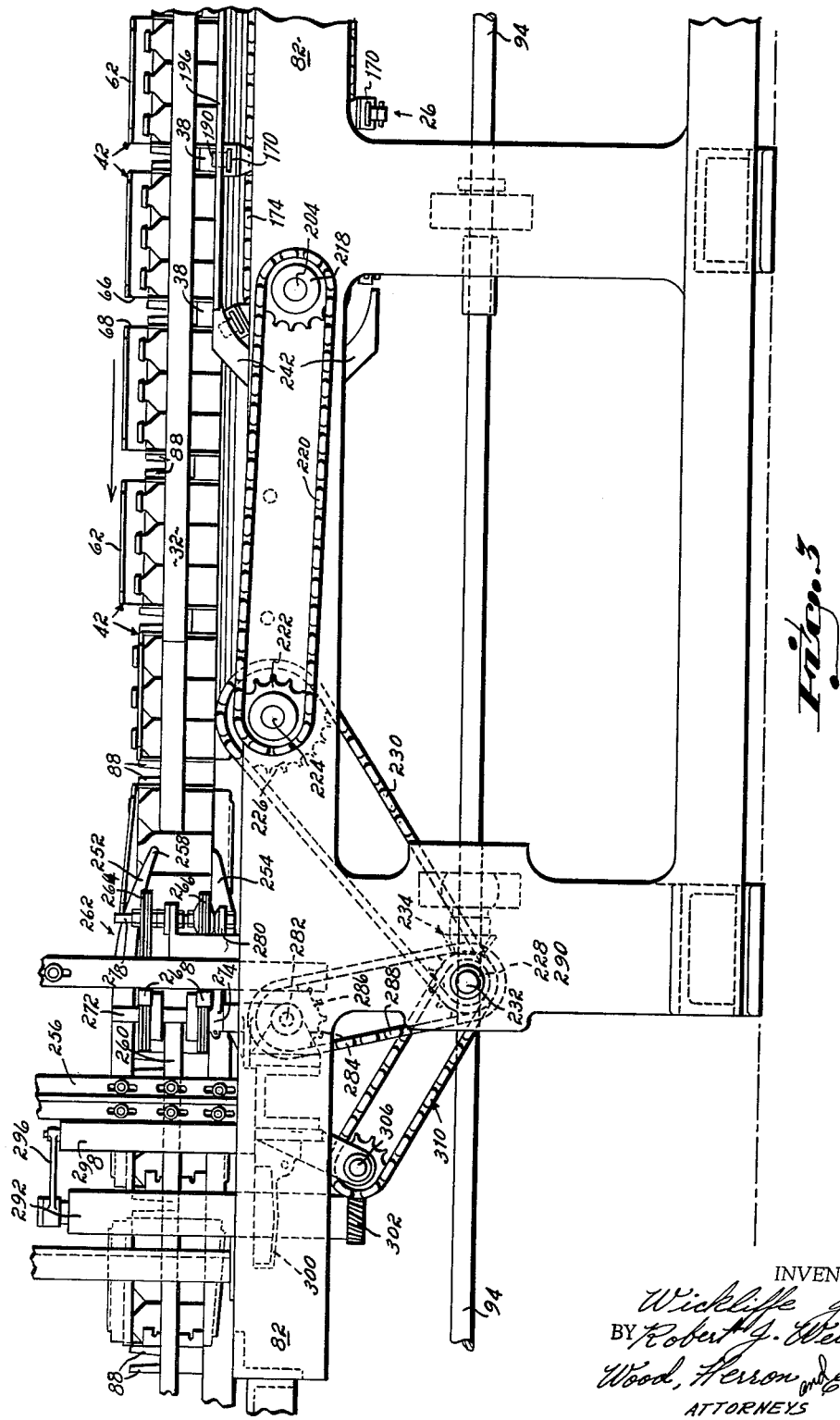

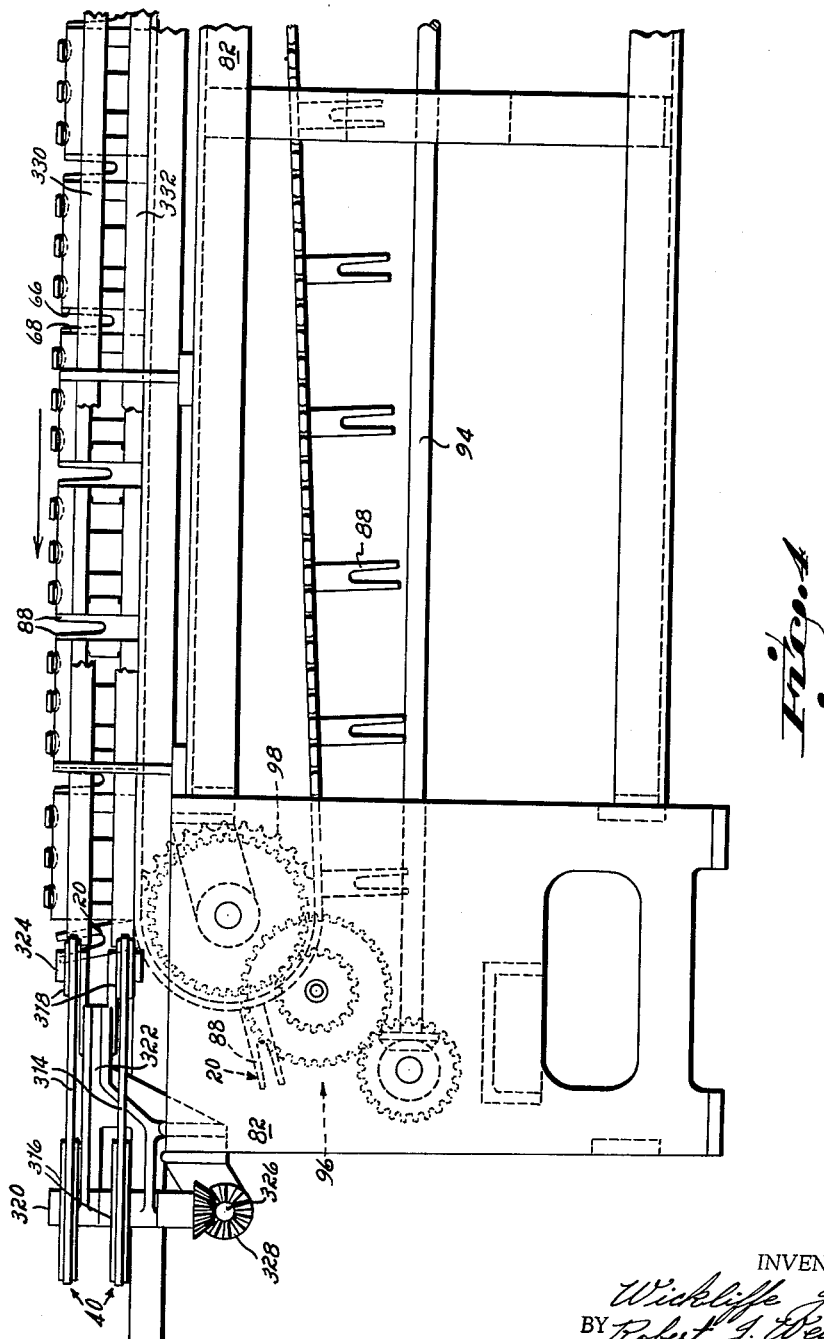

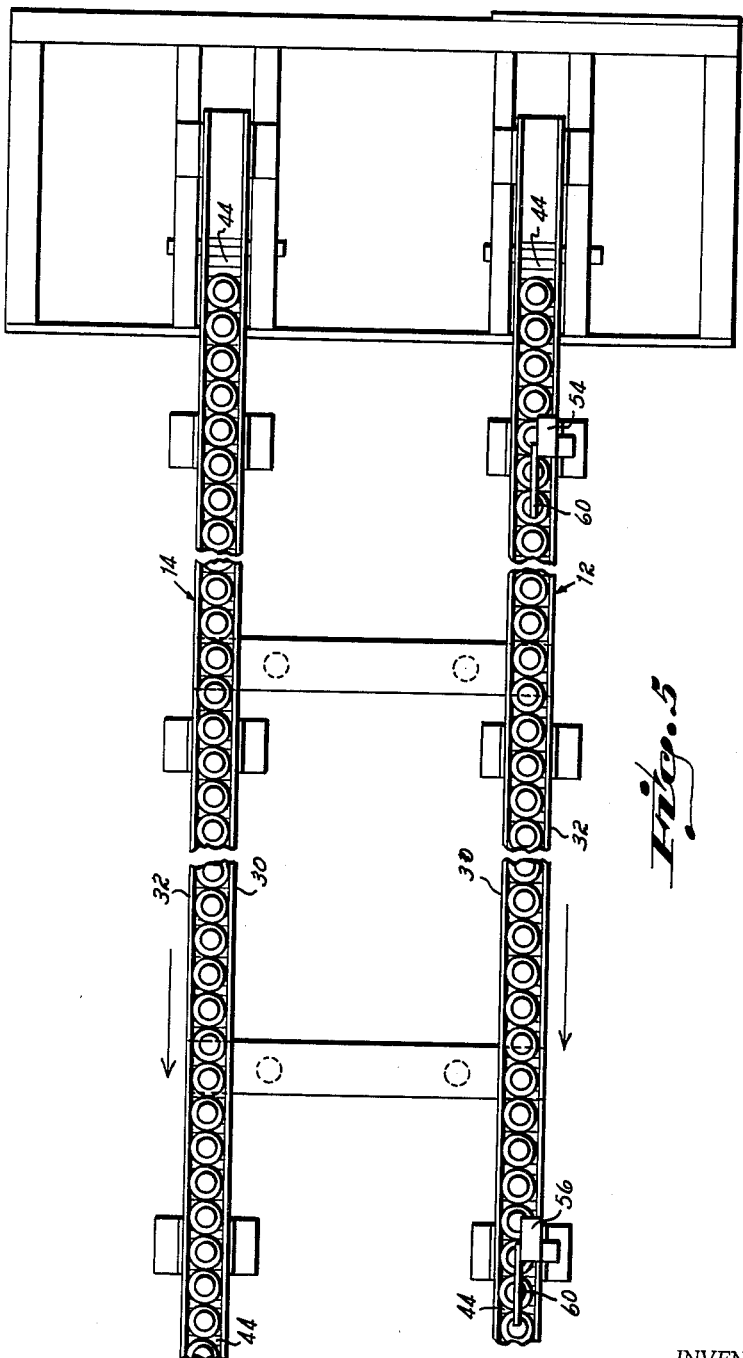

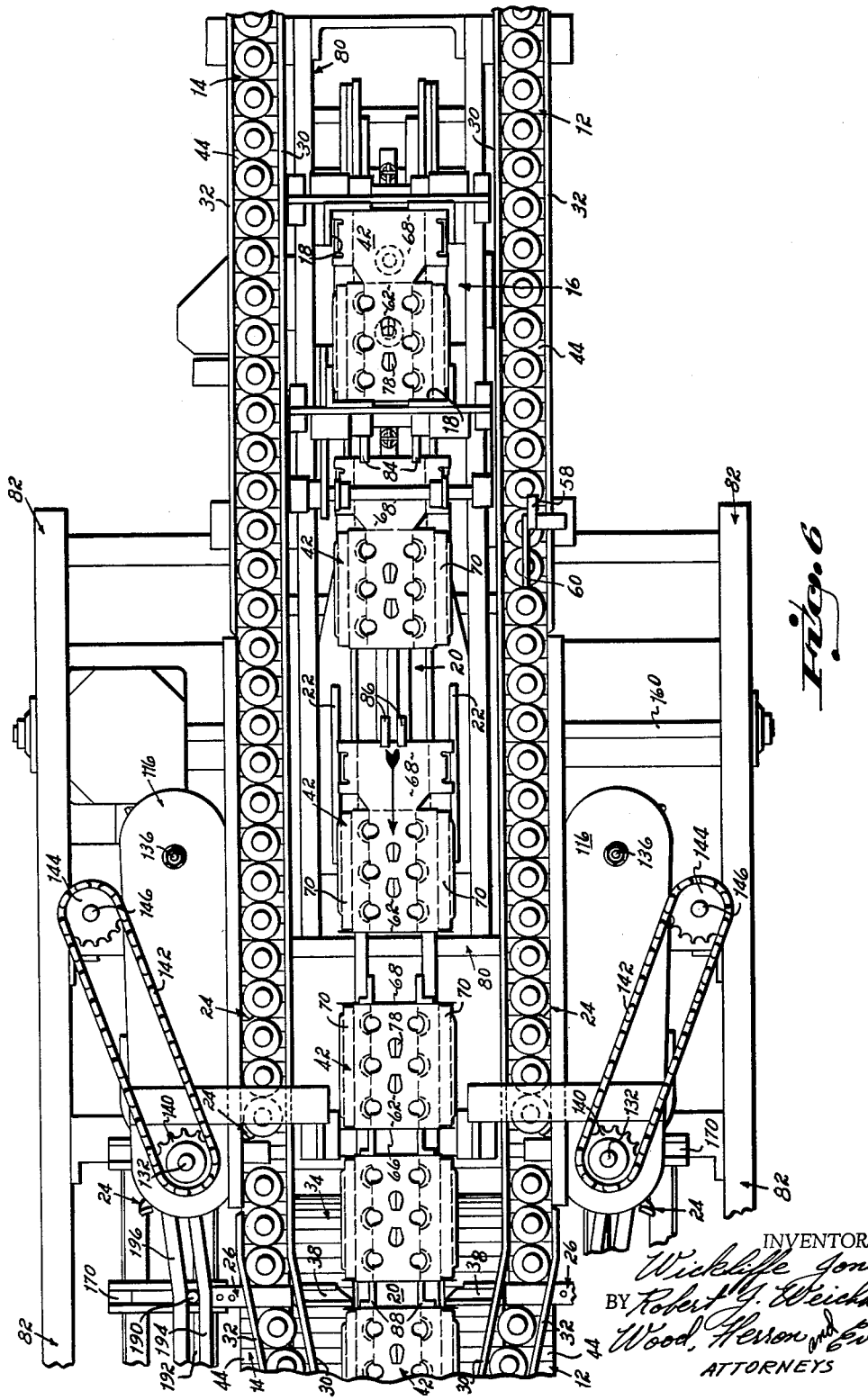

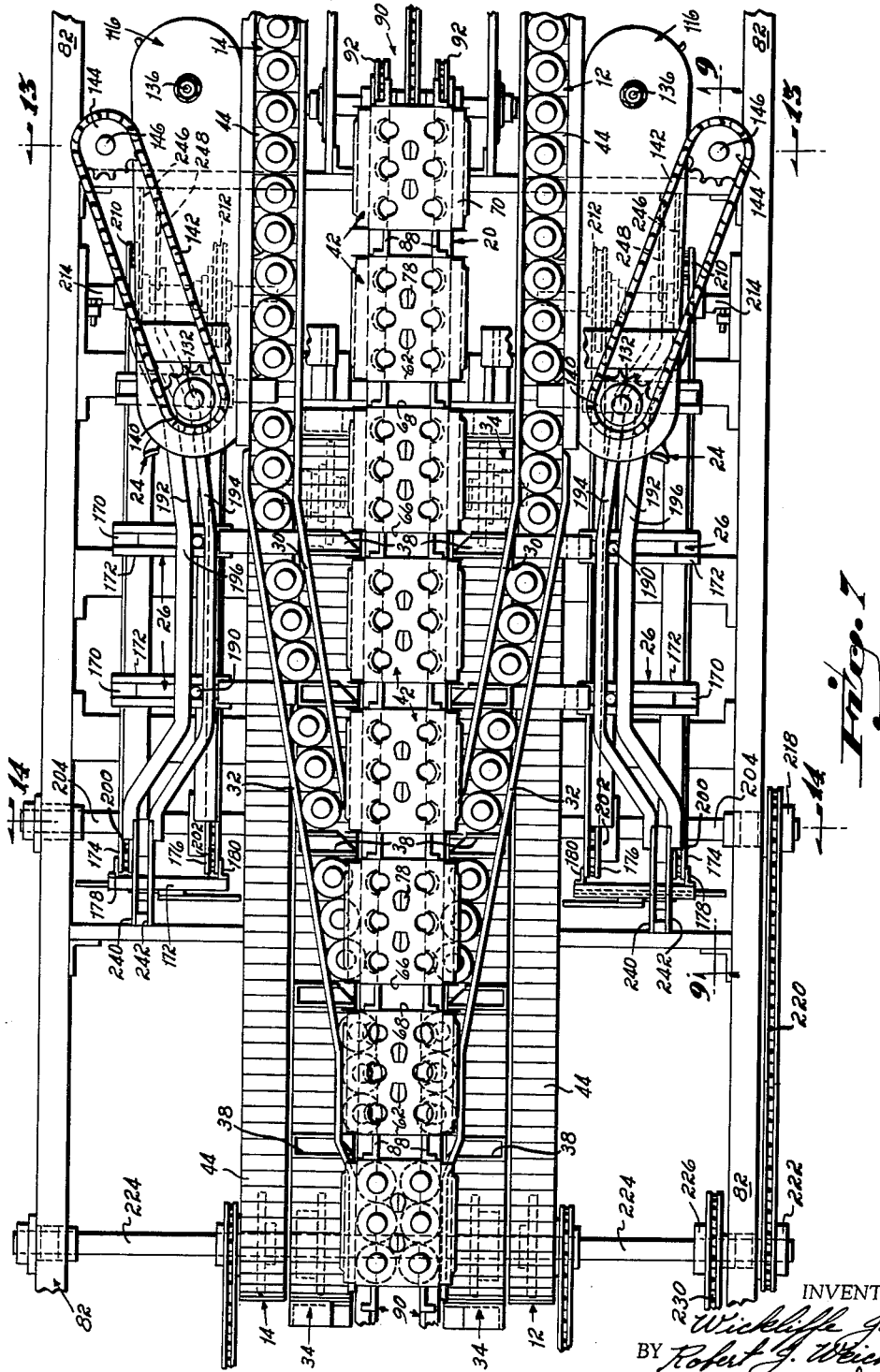

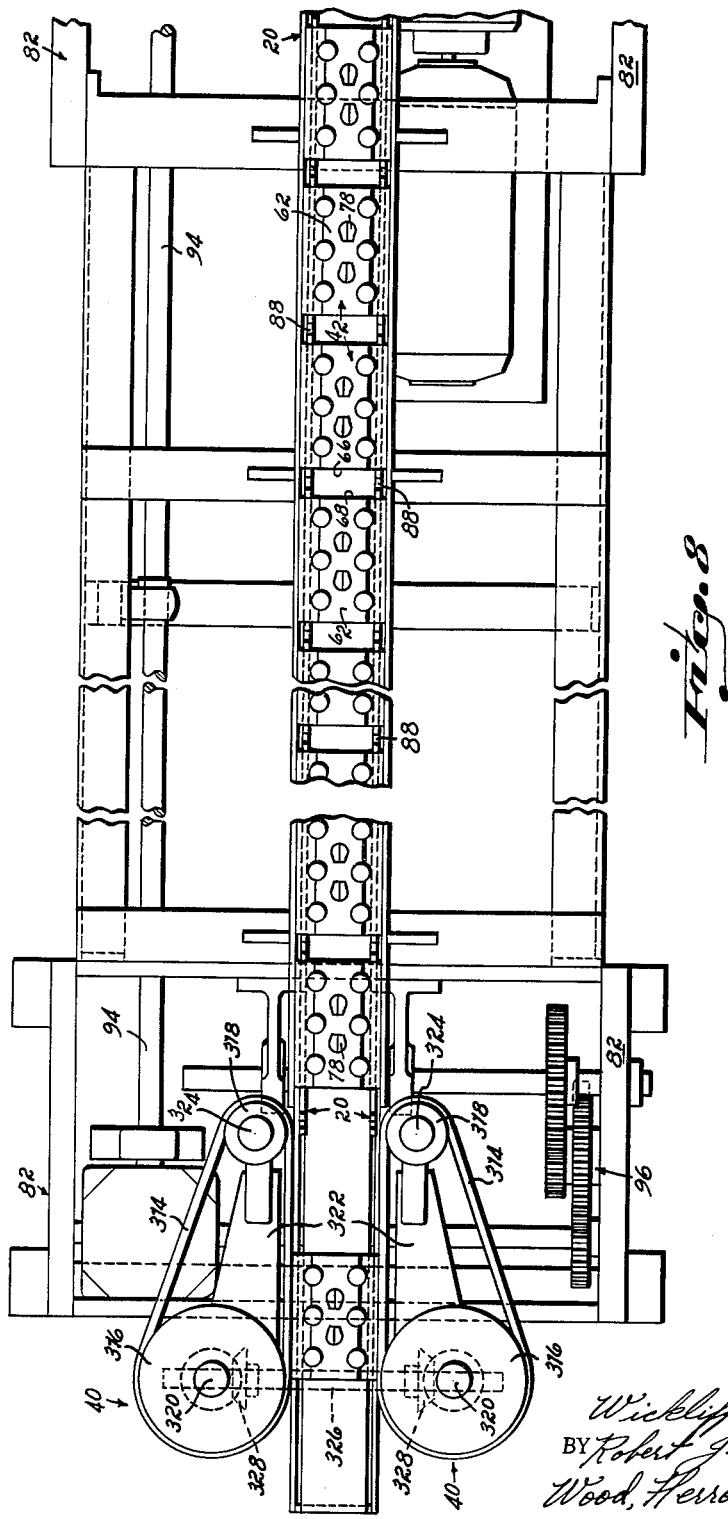

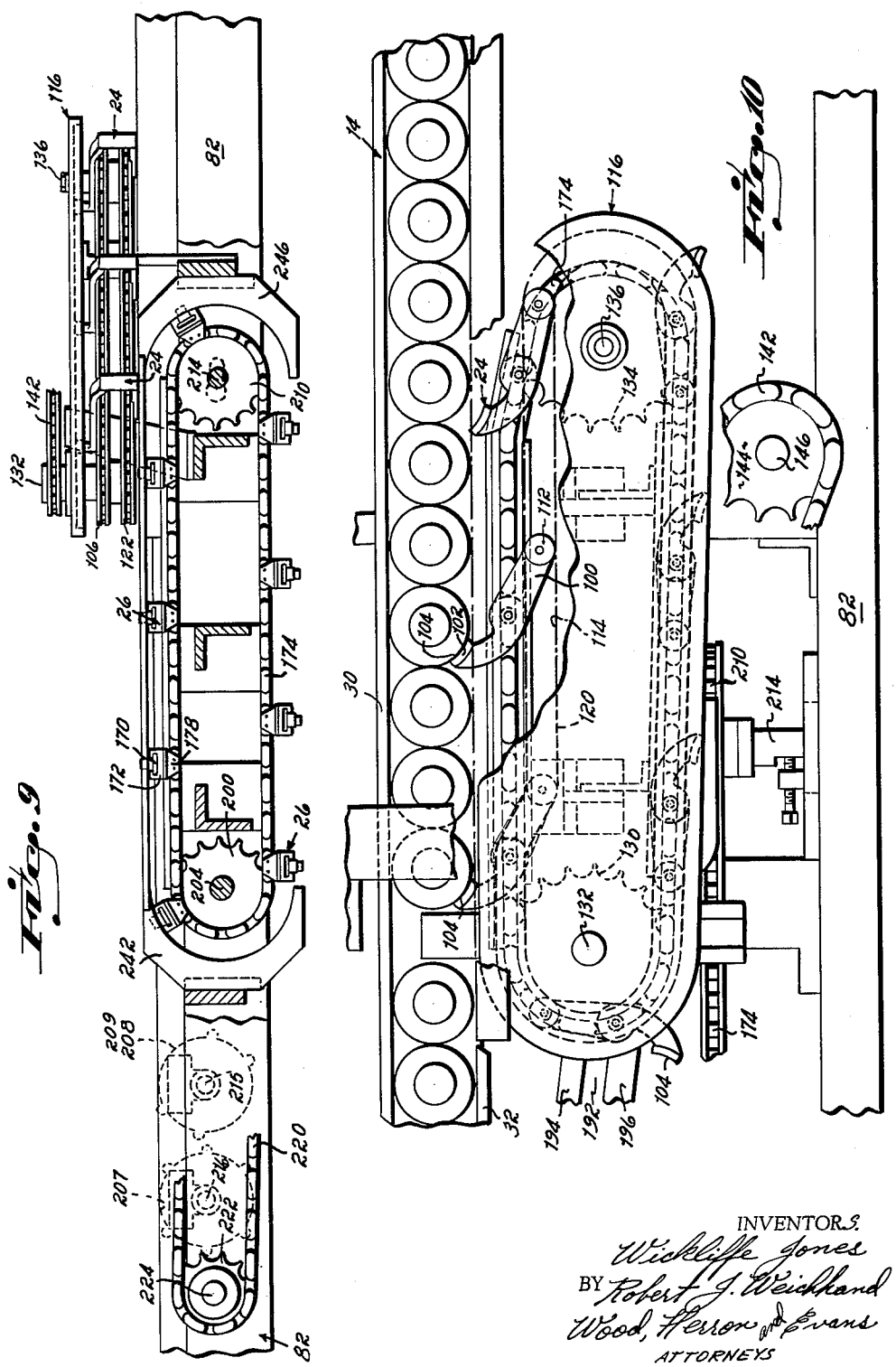

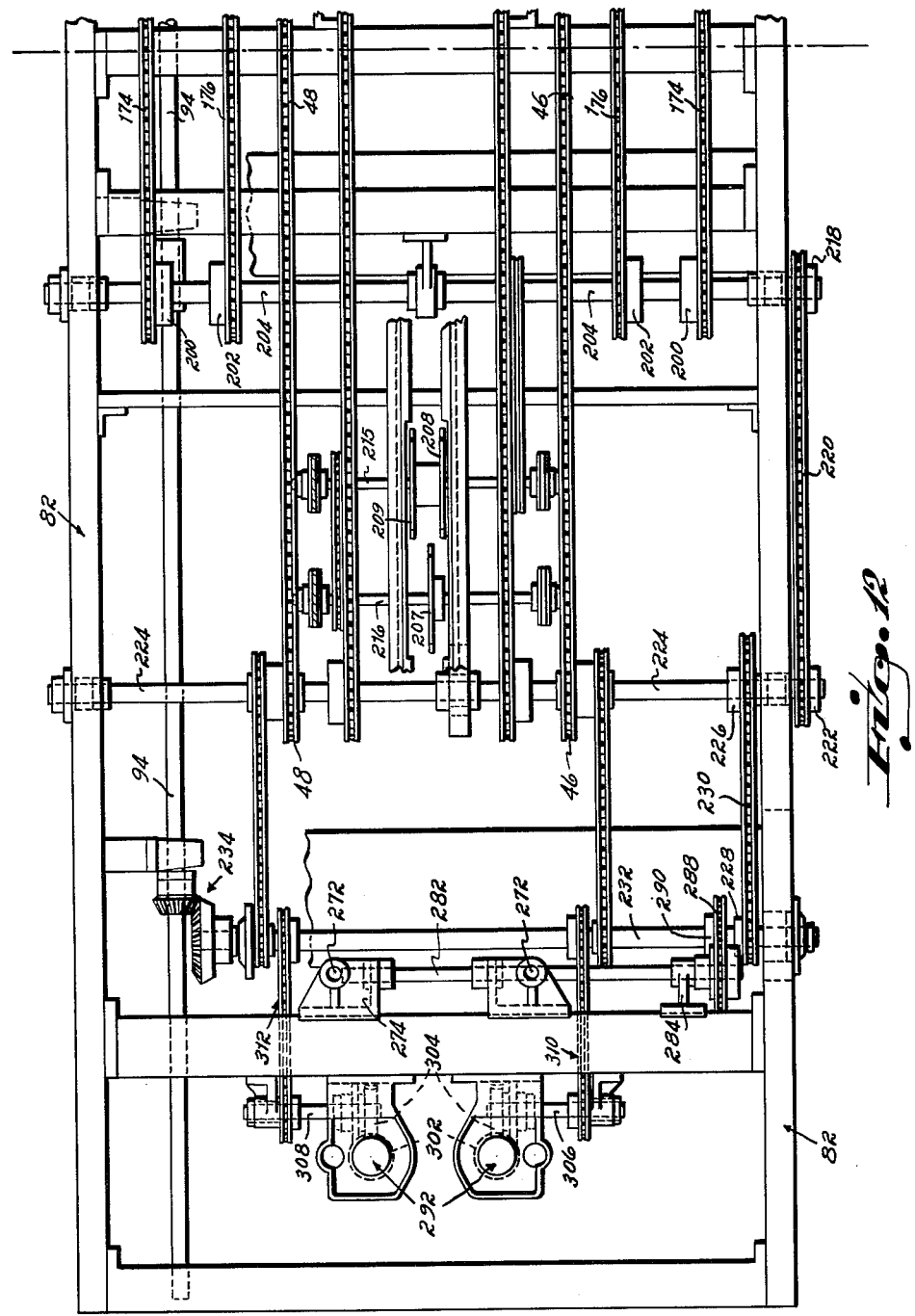

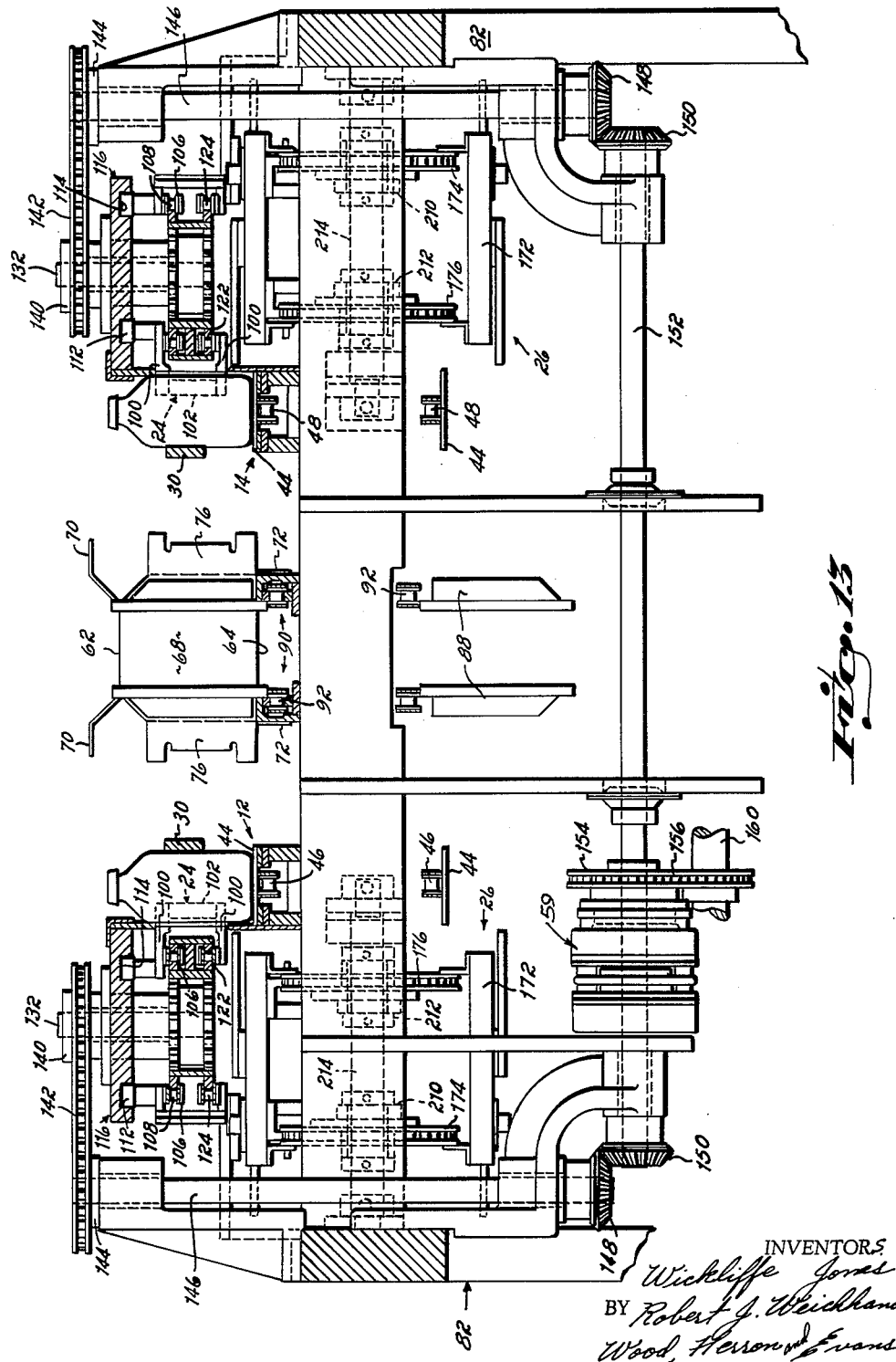

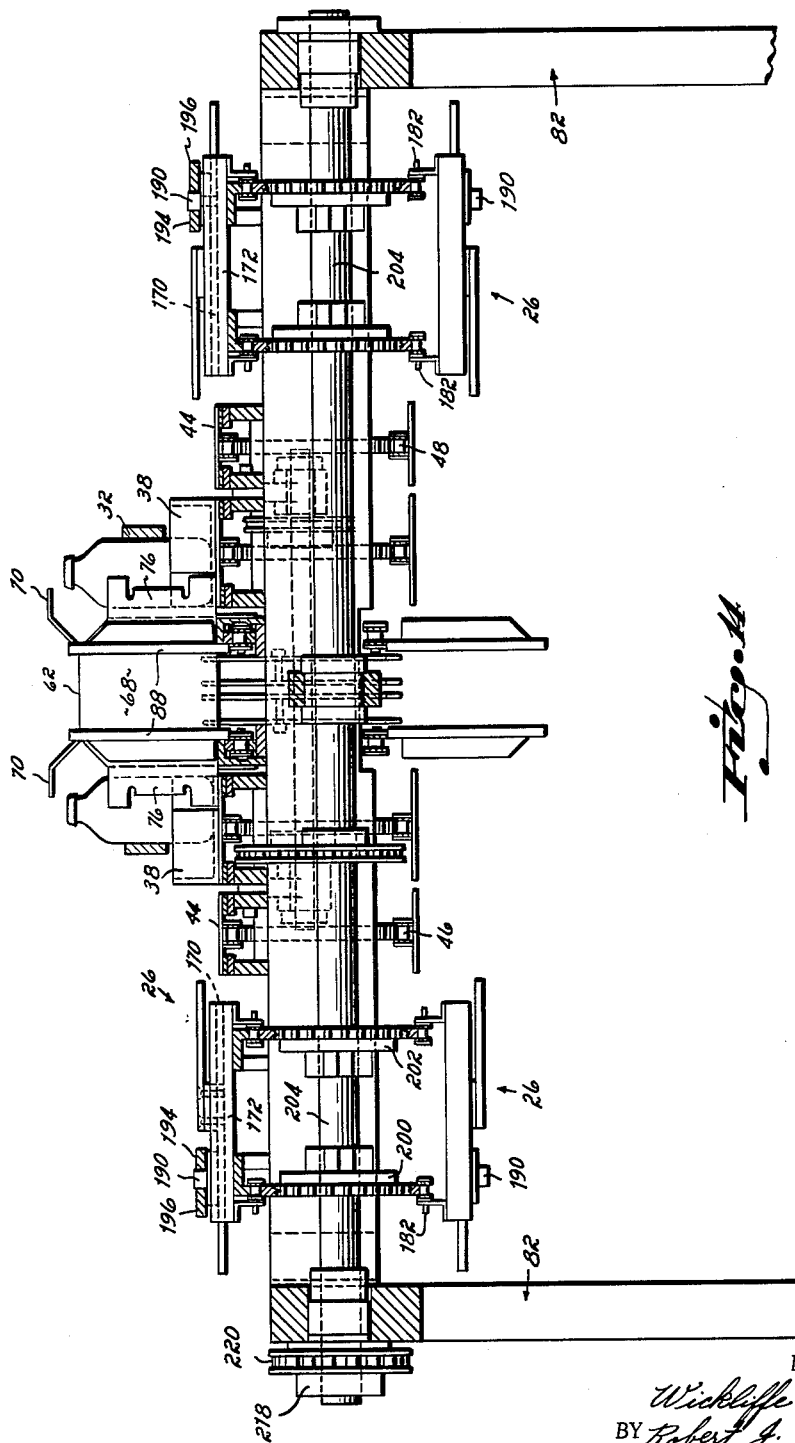

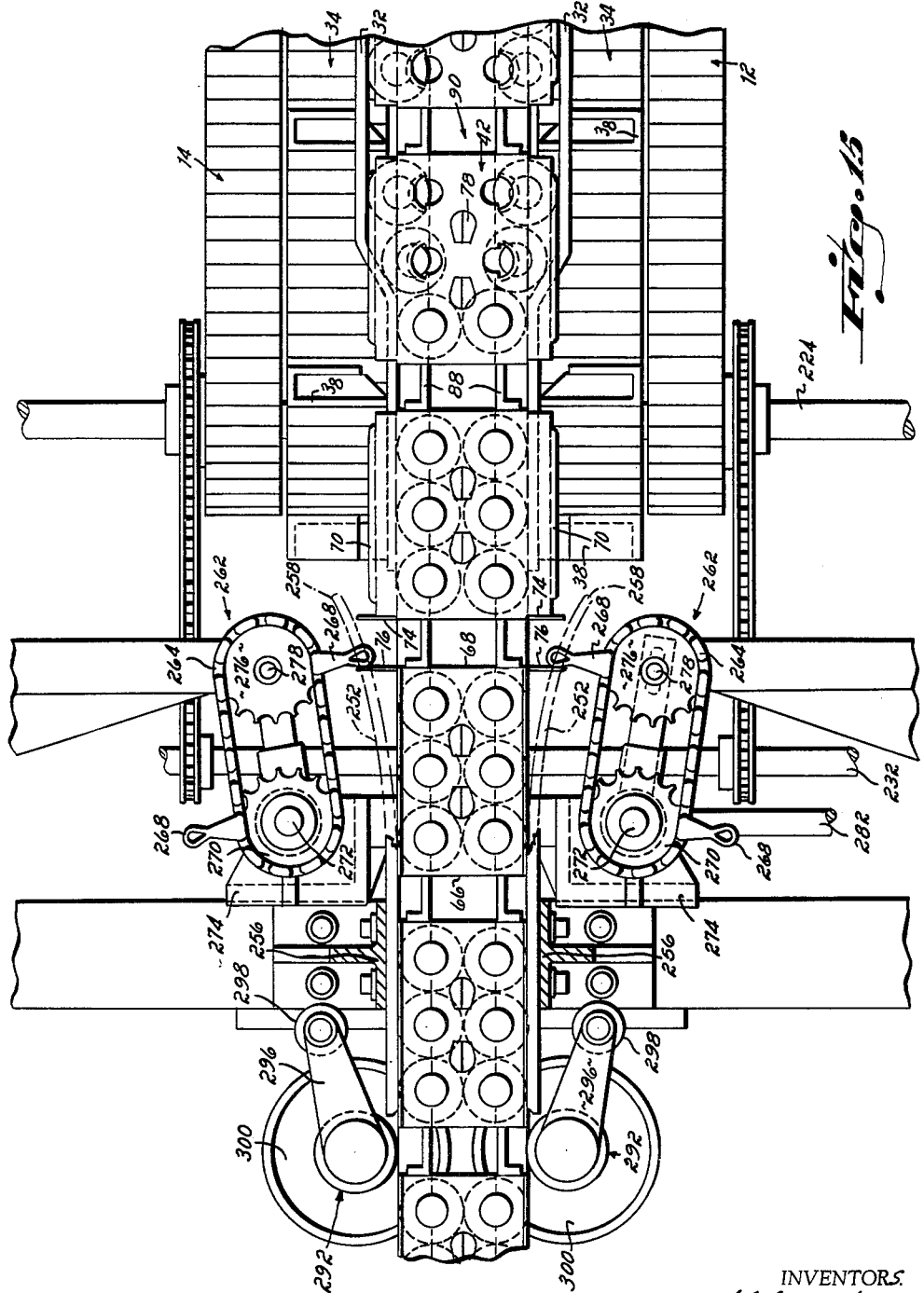

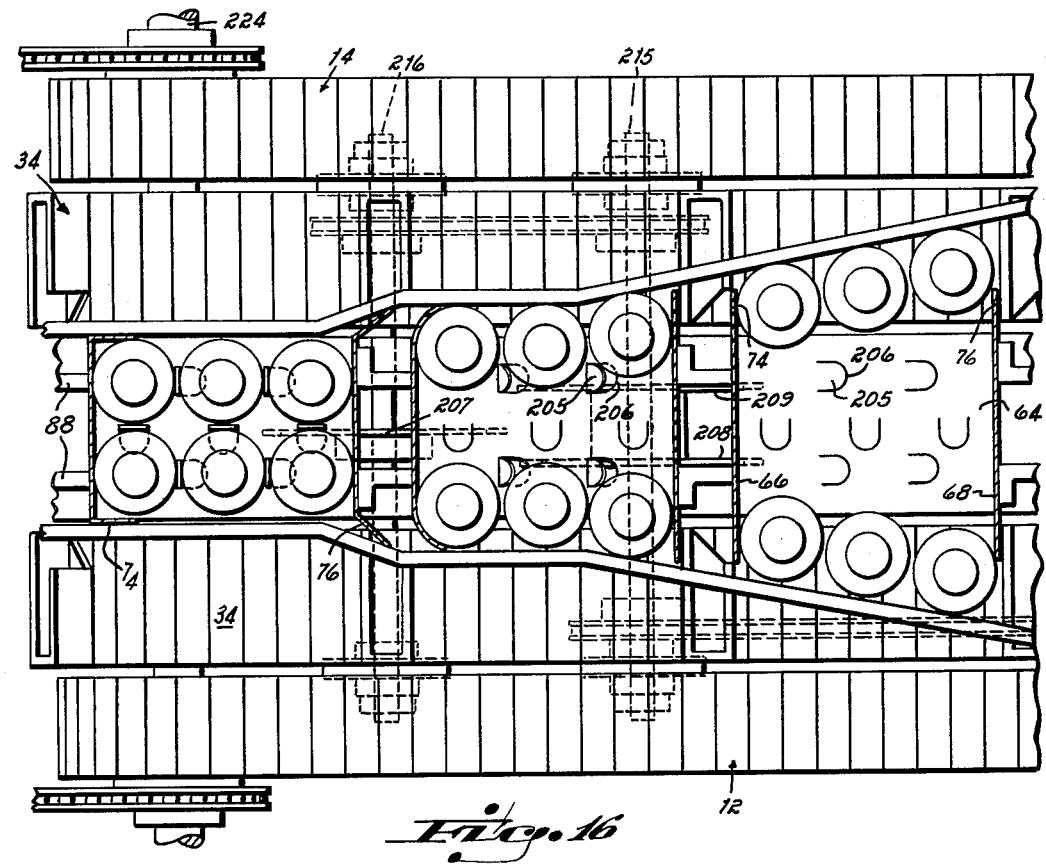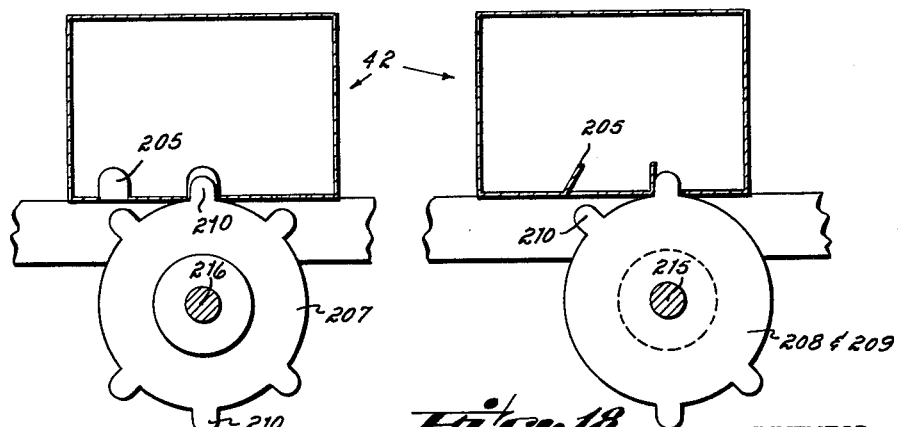

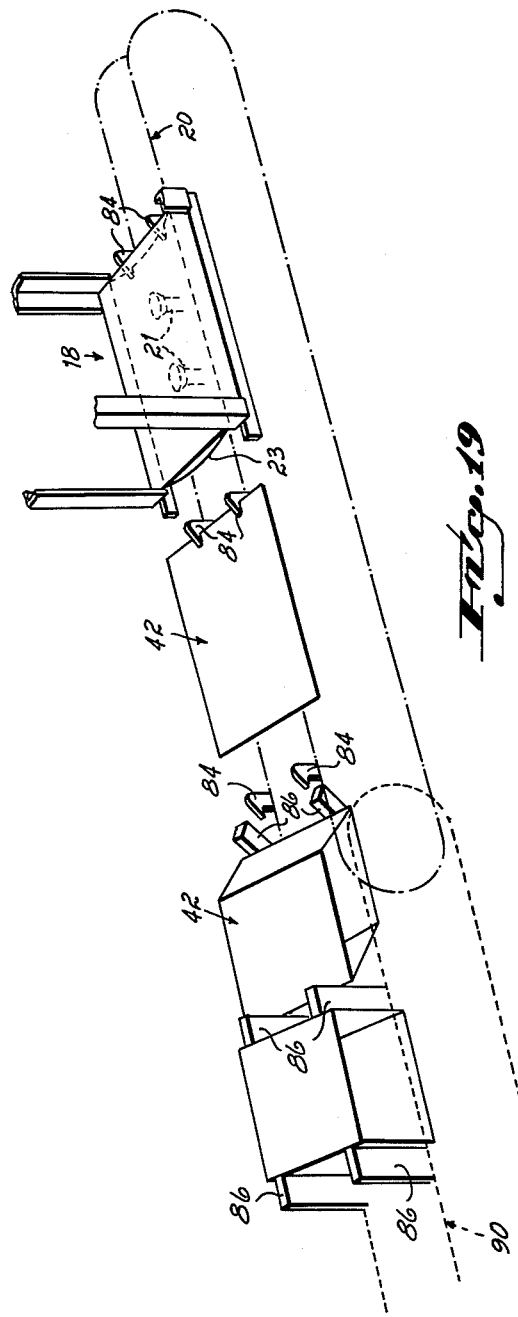

United States Patent Office 3,225,510
Patented Dec. 28, 1965

3,225,510
ARTICLE CARTONING MACHINE
Wickliffe Jones, Cincinnati, Ohio, and Robert J. Weichhand, Covington, Ky., assignors to R. A. Jones and Company, Inc., Covington, Ky., a corporation of Kentucky
Filed May 13, 1963, Ser. No. 280,033
15 Claims. (Cl. 53—48)

This invention relates to article packaging and more particularly to a machine for packing beer bottles in conventional six-pack or eight-pack cartons.

It has been an objective of this invention to provide a machine for automatically packaging beer bottles in conventional six-pack or eight-pack cartons at a very high rate of speed, i.e. 100 to 200 cartons per minute. This application is an improvement upon our copending application Serial No. 152,844 filed November 16, 1961, now Patent No. 3,174,259 for "Article Cartoning Machine," of which this application is a continuation-in-part. That application is directed to a machine particularly adapted to package beer cans while the machine of this application is particularly well suited for packaging beer bottles in either six-packs or eight-packs.

More specifically, the machine of this invention is intended for packaging beer bottles in cartons which are formed of paperboard material and which are furnished in a flat collapsed condition. The collapsed cartons are loaded in stacked formation into a magazine, which includes mechanism for withdrawing the collapsed cartons individually from the lower portion of the magazine subsequently to be erected and loaded. In order to obtain the high loading rate, as indicated above, the bottles, which are fed in a continuous stream, are segregated into groups and the groups advanced into the erected carton from opposite ends. After being loaded with the bottles, liquid adhesive is applied to the flaps of the cartons, then the flaps are folded to a closed position and sealed before the loaded cartons are discharged from the machine.

To perfect a cartoning machine which will handle 600 to 1,200 or more bottles per minute and package them in an automatic manner, the bottles must flow in a substantially straight line continuous movement without any stopping or starting. At the rate of movement of this machine, the inertia of stopping the bottle and starting it again or of jerky acceleration and deceleration would break the bottle or at least scar and tear the paper label. It has thus been an object of this invention to provide a bottle cartoning machine which utilizes smooth acceleration and deceleration substantially straight line continuous flow of the bottles to be packaged and which eliminates abrupt impact reciprocating or oscillating elements which might break the bottle or at least scar the labels upon the bottles. It should be understood that while this machine has been described with reference to packaging bottles, it is equally adaptable to packaging other articles. Of course a machine operable to handle fragile glass is capable of handling metal containers such as beer cans.

The machine includes a series of continuous motion conveyor systems for advancing and erecting cartons after they have been withdrawn individually from the magazine. Thus, the first conveyor apparatus receives the carton blank as it is withdrawn from the bottom of the magazine and includes means for handling the flaps which project outwardly from the opposite open ends of the advancing blank. A first stage conveyor apparatus advances the blank toward a main carton transport conveyor and concurrently partially erects the carton. The partially erected carton is then transferred to a main carton conveyor and during transfer is completely erected by continuously advancing spacer lugs on the main carton transport conveyor. These lugs coact with the first stage conveyor apparatus to completely erect the carton. The spacer lugs of the main carton conveyor confine the carton firmly in its erected condition and advance it toward the bottle loading zone with the several carton flaps extending outwardly to an open position to avoid any interference of the bottles as they are advanced into the open end of the erected carton.

As the erected carton advances to the loading zone, six cans (or eight cans in the case of an eight-pack) are fed laterally from a pair of parallel bottle conveyors into the opposite ends of the carton by stationary converging guide rails. The bottles are segregated into groups of three each (or four in the case of an eight-pack) and fed into the carton. The segregating mechanism consists of restraining fingers which enter in front of every third bottle. These restraining fingers move at a slower rate than the bottle conveyors so that the restraining fingers slow the movement of the bottles. The down stream finger then releases a group of three which move away from the finger or move downstream at a rate determined by the bottle conveyor which is moving faster than the restrained bottles. As soon as the group of three bottles have moved downstream so as to establish a gap between the restrained bottles and the unrestrained ones, spacer fingers enter the gap so as to maintain the spacing between the now grouped bottles. Guide rails then force the group of bottles across a continuously moving bucket conveyor which maintains the spacing of the groups and into the open sides of the cartons. After the bottles are loaded into the carton, liquid adhesive is supplied to the flaps and the flaps are folded to a closed position and sealed as the carton advances toward the discharge end of the machine.

A further objective of the invention has been to provide an improved segregating mechanism for forming articles into groups while advancing the articles toward a packaging zone where the segregated groups are fed transversely into the open end of an advancing carton.

According to this aspect of the invention, the restraining fingers are moving downstream at approximately the same rate as the continuous stream of bottles when they engage the bottles so as to retard the bottle movement. The fingers then release the bottles in groups of three which are conveyed away from the restrained bottles at a faster rate of speed so that a gap is established between the newly formed group. This spacing is then maintained by cam operated spacer fingers. The restraining fingers are mounted upon an endless chain conveyor and are cam actuated so that they gently engage the bottles while simultaneously moving downstream with the bottles. In this way the contact between the bottle and the restraining finger is gentle and there is no tendency for the bottle to break or the label to be scarred by the restraining finger.

The machine can best be further described with reference to the drawings in which:

FIGURES 1 through 4 are a side elevational view of the bottle cartoner of this invention, FIGURES 5 through 8 are a top plan view of the cartoner, FIGURE 9 is a cross sectional view taken along line 9—9 of FIGURE 7, FIGURE 10 is an enlarged view partially broken away of a portion of the machine shown in FIGURE 7, FIGURES 11 and 12 are a top plan view of the drive system of the machine, FIGURE 13 is a cross sectional view taken along line 13—13 of FIGURE 7, FIGURE 14 is a cross sectional view taken along line 14—14 of FIGURE 7, FIGURE 15 is a top plan view of the carton flap folding mechanism of the machine, FIGURE 16 is an enlarged top plan view of a portion of the machine shown in FIGURE 7, but with the tops of the cartons removed for purposes of clarity, FIGURES 17 and 18 are diagrammatic illustrations of the spacer tab folding cams.

FIGURE 19 is a schematic illustration of the carton storing mechanism, the carton feeding mechanism, and the carton erection mechanism of the machine.

GENERAL ARRANGEMENT AND OPERATION

Referring to the drawings, FIGURES 1 through 4, which illustrate a side elevational view of the overall machine and FIGURES 5 through 8, which illustrate a top plan view of the overall machine, will be primarily relied upon to describe its principles of operation. The individual component sections of the machine are described later with reference to the detailed views of the several component mechanisms.

This application is a continuation-in-part of application Serial No. 152,844 filed November 16, 1961 entitled "Article Cartoning Machine." In general organization the machine of that application and of this invention are very similar. The primary difference between the two applications is that the machine of this application is utilized for packaging six-packs of beer bottles while the machine of that invention was utilized for packaging six-packs of beer cans. While the problems involved in an automatic packaging machine or cartoning machine for beer bottles and beer cans are in most respects very similar, the differences are sufficient to require some special handling with respect to the bottles. Of course, the bottles are more fragile which necessitates special handling techniques. Additionally the labels of the beer bottles are constructed of paper adhesively secured to the bottle while in the case of cans the labels are lithographed on the metal. The paper labels are much more subject to tearing and scratching, etc. and thus must be handled more gently than the beer cans with their lithographed labels.

As indicated by the heavy arrows in FIGURE 5, the bottles to be packed are fed from the bottle filling machines (not shown) onto two parallel line bottle conveyors 12 and 14. The parallel line bottle conveyors 12, 14 pass on opposite sides of a carton feeding mechanism indicated generally at 16. The carton feeder 16 consists of a magazine 18 and discharge mechanism which feeds flat cartons onto a carton conveyor system indicated generally at 20. The carton conveyor system 20 and bottle conveyors 12, 14 move in the same direction with the bottle conveyors 12, 14 being located on opposite sides of the carton conveyor 20.

The carton feeder 16, magazine 18, carton discharge mechanism, and the carton conveyor system 20 are identical to those disclosed in application Serial No. 152,844 of which this application is a continuation-in-part. Therefore, for the sake of clarity and brevity, they are not described in detail in this application.

The cartons utilized in this machine are the conventional six-pack beer containers which when placed in the magazine of the carton feeding mechanism 16 are of preformed shape and have the conventional fold lines but are in the flat condition. The cartons are placed in the magazine 18, in collapsed condition to be erected during continuous advancement of the carton toward the carton loading section of the machine. The collapsed cartons are withdrawn from the bottom of the stack, one at a time, and placed on the carton conveyor 20. As the cartons move continuously down the carton conveyor line, they are erected by carton erecting mechanism 22, which cooperates with the carton conveyor 20 to completely erect the previously folded and flat cartons. The erected cartons continue to move down the carton conveyor line to the loading section of the machine where a segregated group of three bottles are fed laterally into both open sides of the erected carton.

Before being fed into the cartons, the beer bottles must be segregated into groups of three. The segregating mechanism of this invention consists of continuously moving cam operated restraining fingers 24 which enter in front of every third beer bottle and slow the movement of the continuous moving bottles so as to positively establish a gap between every group of three bottles. Thereafter, continuously moving cam operated separator fingers 26 enter the gap between the groups of bottles and maintain the grouping arrangement. The separator fingers 26 also cooperate with guide rails 30, 32 to force the segregated groups of bottles off of the bottle conveyors 12, 14 and onto the continuously moving bucket conveyors 34. The bucket conveyors 34 each have a plurality of spacers 38 aligned with the separator fingers 26 which maintain the segregated groups of bottles in the proper number of segregated groups to be loaded into each side of the open cartons.

As the groups of bottles are forced toward the discharge end of the machine by the bucket conveyors 34, the bottles are forced off of the bucket conveyors 34 by the guide rails 30, 32 which extend across the top of the bucket conveyors. These guide rails force the segregated groups of bottles into the open sides of the carton.

With the bottles located within the carton, the top flaps are folded downwardly and the front and rear side flaps of the carton are folded inwardly after glue has been placed upon the inside edge of the side flaps. The side flaps are maintained and held in their inward position as pressure is exerted and the cartons continue out of the machine. A speed belt arrangement 40 pulls the cartons off of the main conveyor and out of the machine.

It should be noted that the machine is arranged for continuous feeding so that there is no intermittent stopping and starting of either the cartons or the beer bottles as they proceed along the various conveyors. This has been found to be advantageous and possible absolutely necessary when the machine is operated at the speed for which this machine is designed, for example 100 to 200 cartons per minute.

BOTTLE FEEDING AND CONVEYOR MECHANISM

Bottles are fed to the two bottle conveyor lines 12, 14 of the cartoning machine from bottle capping machines or other machinery in the integrated plant in which the cartoning machine of this invention is to be utilized. Of course, the bottles could be placed on the bottle conveyors by hand if desired but in usual practice they are fed onto the conveyors from another machine.

The bottle conveyors 12, 14 extend nearly the full length of the machine up to the point where the bottles are loaded into the cartons 42. They are of the endless chain type and have plates 44 mounted upon each link of the chain. The chains 46, 48 ride over sprocket wheels 50 at the rear of the machine and are driven from sprocket wheels (not shown) at the front of the machine. The driving sprocket wheels are driven by a constant speed auxiliary motor (not shown) in the same manner as is explained in detail in our co-pending application Serial No. 152,844. Mounted over the bottle conveyors upon the frame 52 which supports them, are three switches 54, 56 and 58. These switches are all normally closed and spaced longitudinally along the bottle conveyor 12. Each includes a switch actuating bar 60 which extends over the line of bottles progressing down the conveyor in a position to be engaged by the bottles as they move along the conveyor. The first of these switches 58 or the one nearest the output end of the machine is the minimum prime switch. It is located rearwardly of the bottle segregating mechanism and controls the carton feeding mechanism and the flow of bottles along the conveyor. So long as this switch 58 is held in the open position by bottles progressing past the switch and stacked up to a point beyond the switch 58, the cartons will continue to be fed into the machine from the magazine. If, however, the minimum prime switch 58 should be closed for lack of bottles stacked up to a point back to this switch, the carton feed mechanism 16 will be caused to stop feeding the cartons onto the conveyor. Additionally, lack of cartons on the carton conveyor will trip a switch (not shown) to cause the segregating unit to stop via electric clutch 59 and the machine to drop to a lower speed. So long as bottles are stacked up behind the minimum prime switch 58, the machine continues to operate normally. However, should this switch be opened by lack of bottles flowing thereby, the carton flow and bottle flow into the machine will be stopped while those cartons and bottles in the machine will continue to be fed into the respective cartons and out of the machine. The purpose of this arrangement is to prevent any cartons from being stopped in midprocess after having had glue applied thereto in which event the glue would dry without the carton having been properly sealed.

The switch 56 is a medium speed control switch. Thus if the bottles are stacked up in the machine back to the switch 56 so as to maintain it in the open position, it will, through conventional circuitry (not shown), cause a variable speed main drive motor (not shown) to be driven at 50% of its full operating speed. In much the same manner the switch 54 is a speed control switch which, when the bottles are stacked up on the bottle conveyors 12 and 14 back to this switch, causes the main drive motor to drive the machine at full flow capacity.

CARTON HANDLING AND ERECTING MECHANISM

This machine is designed to handle from 100 to 200 cartons per minute and therefore necessarily includes a carton feeding and erecting mechanism operable to handle cartons at this rate. Referring to FIGURES 6, 13, 15 and 16, it will be seen that the particular cartons utilized in this cartoning machine consist of a flat container formed into a closed loop and having the conventional fold lines thereon to form the top 62, bottom 64, front 66 and rear wall 68 of the erected carton. The carton also has the usual top side flaps 70, bottom side flaps 72, front side flaps 74 and rear side flaps 76 (see FIGURE 15). The top of each carton has the usual holes through which the neck of the bottles extend and the usual finger holes 78 by which the filled carton is adapted to be lifted and carried.

The carton feeding and erecting mechanism is mounted upon a separate frame 80 which is received between the bottle conveyors 12, 14 and abuts against the end of a bottle handling and carton filling frame 82 of the machine. The carton feeding and erecting mechanism of this application is identical to that disclosed and described in detail in application Serial No. 152,844. Therefore, it will not be described in detail in this application.

In general, the flat cartons are stored in the magazine 18 and gravity fed downwardly onto the carton conveyor 20. The bottom carton of the stack in the magazine is separated from the stack by means of a cam operated suction mechanism 21 operating in conjunction with and cooperating with cam operated detent fingers (not shown). The center of the lowermost carton 23 is engaged by the suction cups 21 which bow the center portion of the carton downwardly. Thereafter the detent fingers enter the gap between the lowermost carton and the one next above it in the stack and maintain the carton bowed after the vacuum in the suction cup is released. With the carton bowed, fingers 84 of a first carton conveyor engage the rear edge of the folded carton and push it out of the magazine. While the carton is being conveyed by the fingers 84 of the first carton conveyor the trailing edge of the folded carton is engaged by the leading edge of fingers 86 of a second carton erection conveyor. These fingers push the carton downstream to the carton erection stations which erect the carton as it continues to move. While the carton is being erected, lugs 88 engage the trailing end leading edge of the partially erected carton and complete the erection. The main carton transport conveyor 90 then continues to carry the erected cartons downstream to the filling station and out of the machine. For details of the carton erection mechanism, the reader is referred to our co-pending application Serial No. 152,844.

MAIN CARTON TRANSPORT CONVEYOR AND CARTON FILLING MECHANISM

The main carton transport conveyor 90 consists of a double endless chain conveyor which transports the erected cartons to the filling mechanism and out of the machine. Each of the chains 92 has a plurality of spacer lugs 88 mounted thereon. The spacer lugs consist of rectangular plates having a V-shaped notch extending downwardly from the top surface. The lugs 88 are mounted upon the two chains at transversely parallel locations so that a lug on each chain will be engaged with each carton. The distance between the rear of one lug and the front of the next lug is equal to the length of the cartons so that there are no void areas or void pockets between the lugs and the cartons and each lug has an erected carton abutting against it at both its front and rear vertical surface.

The main carton transport conveyor 90 is identical to that disclosed in our co-pending application Serial No. 152,844. It is driven by the main cycle drive shaft 94 through a series of spur gears 96 and a pair of sprockets 98 (FIGURE 4).

Prior to being transferred from the bottle conveyors 12, 14 the bottles are segregated into groups of three or four depending upon whether the bottles are to be packaged in the conventional six-pack or eight-pack cartons. In the illustrated embodiment, the bottles are segregated into groups of three. The segregating mechanism consists of restraining fingers 24 which are cam operated so as to engage the front of every third bottle and retard its movement. The segregating mechanism on both sides of the main transport conveyor is identical so that only that on one side will be described although it should be understood that an identical segregating mechanism is associated with each bottle conveyor 12 and 14.

The bottle conveyors 12, 14 have a faster rate of travel than the restraining fingers so that the fingers engage the bottles and restrain their movement. The bottle conveyors continue to move at a constant rate so that the bottles frictionally slide over the plates 44 of the conveyors. In this way an adequate supply of bottles to the restraining fingers is always maintained and there is no opportunity for a group of less than three bottles to be inserted into any carton.

Referring to FIGURES 10 and 13, it will be seen that the restraining fingers 24 consist of a pair of horizontal links 100 interconnected by a vertical bottle engaging strip 102. As may be clearly seen in FIGURE 10, the bottle engaging strip has an arcuate surface 104 adapted to engage and cradle the bottles therein. Because the bottles are engaged and restrained in their movement by the arcuate surface 104, there is no line contact between the restraining member and the bottle and thus no tendency for the label on the bottle to tear or be otherwise marred by the restraining fingers.

The uppermost connecting links are pivotally connected near their midpoint to an endless chain 106 by a depending pivot pin 108. The links 100 also have an upstanding pin 110 attached to the end of the link. A cam follower roller 112 is rotatably mounted on the top of each of the pins 110 and extends into a slot 114 in the lower surface of a cam plate 116. The slot 114 is generally parallel to the path of movement of the endless chain 106 upon which the fingers 24 are pivotally mounted.

However, one section 120 of the slot is spaced outwardly away from the vertical plane of the chain. This section of the slot thereby forces the rollers 112 away from and out of the plane of the chain thereby moving the bottle engaging strips 102 into engagement with the bottles and restraining every third one from moving faster than the linear speed of the chain 106 which moves slower than the bottle conveyors 12 and 14. In the preferred embodiment, the linear speed of the chain 106 and attached fingers 24 is approximately 30% slower than the speed of the bottle conveyors 12 and 14 and the carton conveyor 90. Thus, when the finger 24 releases a group of three bottles, the three released bottles move away from the trailing restrained bottles and after having moved a distance equal to approximately three times the diameter of the bottles, the distance between the first bottle in the next group and the last bottle in the unrestrained group will be equal to approximately the diameter of one bottle.

The bottom link of connecting links 100 of the fingers 24 are also pivotally attached to an endless chain 122 by pivot pins 124. The chain 122 is mounted directly beneath the chain 106 and runs parallel to it in the horizontal plane.

The chains 106 and 122 are driven by a pair of sprockets 130 mounted upon a driven shaft 132. At the rear the chains 106 and 122 rotate over a pair of idler sprockets 134 mounted upon idler shaft 136. As shown in FIGURE 13, the driving shaft 132 extends upwardly through the cam plate 116 and has a sprocket 140 keyed or otherwise rigidly attached thereto. The sprocket 140 is driven by a chain 142 from a sprocket 144 mounted upon a shaft 146. The shaft 146 is located in the vertical plane and has a beveled gear 148 on its lower end which meshes with and is driven by a beveled gear 150 of a horizontally or transversely extending shaft 152. The shaft 152 is driven by a sprocket 154 mounted thereon. As best illustrated in FIGURE 11, the sprocket 154 is driven by a chain 156 which is in turn driven by a sprocket 158 mounted upon a shaft 160. The shaft 160 is driven through beveled gears 162 by the main drive shaft 94.

After the restraining finger 24 releases a group of three bottles, the group moves forward away from the next group which are at this time restrained by the next restraining finger. As the unrestrained group of three bottles moves forward on the bottle conveyors 12, 14, separator fingers 26 enter the gap between the groups and maintain the proper spacing between the groups for insertion into the cartons. Thus the restraining fingers act as a restraining medium to group the bottles into the proper number for insertion into the sides of the carton and for establishing a gap between the bottles of sufficient width for the entry of the separator fingers 26 between the groups.

The separator fingers 26 are mounted upon endless chain conveyors and are cam actuated so as to enter the gap between the groups of bottles and maintain the spacing. The separator fingers 26 and the mechanism for actuating the fingers are identical on both sides of the machine. Therefore, only that mechanism associated with the bottle conveyor 12 will be described in detail although it should be understood that an identical mechanism is located on the opposite side of the machine in association with the other bottle conveyor 14 and operates in the same way to maintain the spacing between the bottles on that conveyor.

Referring to FIGURES 9, 13 and 14, it will be seen that the separator fingers 26 are slidably mounted within dove-tailed slots 170 in a supporting block 172. The supporting blocks 172 are attached at their lateral ends to a pair of endless chains 174, 176 by a pair of supporting brackets 178, 180. The brackets are welded or otherwise rigidly attached to the supporting blocks 172 at one end and at the opposite end are secured to the chain by a supporting pin 182.

As shown in FIGURES 7 and 14, a cam follower pin 190 which is adapted to be received within a cam follower slot 192 defined between a pair of cam tracks 194, 196 extends outwardly from each of the separator fingers 26. The cam tracks 194, 196 are located above the endless chains 174, 176 and guide or control movement of the separator fingers only along the upper portion of the finger travel on the chain conveyor. The chain conveyors 174, 176 are supported and driven by a pair of sprockets 200, 202 nonrotatably mounted upon a driving shaft 204. (See FIGURES 11 and 12.) At the rear or upstream end, the chains 174, 176 are supported upon a pair of idler sprockets 210, 212 which are rotatably journalled upon an idler shaft 214.

The shaft 204 is driven by a sprocket 218. The sprocket 218 is driven by an endless chain 220 which is in turn driven by a sprocket 222 and drive shaft 224. Shaft 224 is in turn driven by a pair of sprockets 226, 228 and endless chain 230. The driving sprocket 228 is mounted upon a driving shaft 232 which is driven in rotation by the main drive shaft 94 through a pair of bevel gears 234.

As stated earlier, the separator fingers 26 are controlled by the cam tracks 194, 196 only in their upper position as they move downstream toward the outlet end of the machine. As the fingers pass around the sprockets 200, 202, the cam follower pin 190 moves from between the cam tracks 194, 196 into a slot defined by a pair of guide brackets 240, 242 (FIGURE 7) so that the fingers are held in a restrained position or withdrawn position at this time. As the fingers move back upstream toward the bottle supply end of the machine, the fingers remain in the withdrawn position although there are no guide tracks necessary at this time to hold the fingers in the withdrawn position. As the fingers 26 pass around the sprockets 210, 212 another pair of guide brackets 246, 248 engage the cam follower pin 190 and retain the fingers in the withdrawn position. From the track defined between the brackets 246, 248 the cam follower pins 190 enter the slot 192 defined between the tracks 194, 196. As the fingers move downstream, the slot 192 forces the cam follower pins 190 inwardly between the gap in the groups of bottles. As the fingers continue downstream their inner ends extend over the bottle conveyors 12, 14 and maintain the bottles in spaced relation until they are forced off of the bottle conveyor as is explained more fully hereinafter. As the fingers approach the upstream sprockets 200, 202, the track 192 slopes laterally away from the bottle conveyors 12, 14 and pulls the fingers away from the bottle conveyors into a withdrawn position where they are free to move around the sprockets without interference by the bottle conveyors.

Referring to FIGURE 7, it will be seen that the separator fingers 26 are laterally aligned with the spacers 38 on the bucket conveyor 34. Thus as the bottles are transferred from the bottle conveyors 12, 14 to the bucket conveyors 34 the separator fingers 26 cooperate with the spacers 38 to maintain the groups for transfer into the open sides of the carton. The guide rails 30, 32 extend at an angle over the bottle conveyors and bucket conveyors 34 and force the bottles from the bottle conveyor onto the bucket conveyors. Thus the guide rails 30, 32 act as a camming surface to cam the bottles off of the bottle conveyor onto the bucket conveyor. The guide rails 30, 32 extend across the bucket conveyors up to a position where they abut the lateral sides of the erected carton on the main carton conveyor 90. They thus subsequently force the groups of bottles off of the bucket conveyor and into the open sides of the cartons.

The bucket conveyors 34 are located on both sides of the main carton transport conveyor 90 between the main carton transport conveyor and the bottle conveyors 12, 14. The top surfaces of all of these conveyors are located in the same horizontal plane so that bottles may pass freely from one conveyor to the other by merely sliding laterally.

The bucket conveyors 34 are of the same general variety as the bottle conveyors 12, 14 in that each is an endless chain type conveyor having a plurality of laterally extending plates mounted upon the links of the chains. In addition, however, the bucket conveyors have a plurality of spacers 38 mounted on the top surface to maintain the bottles in groups of three as they are forced across the bucket conveyors into the cartons. Each of the spacers 38 is split transversely to form two sections with each individual section mounted upon a separate plate of the conveyor 34.

The bucket conveyors are identical to those disclosed in our co-pending application Serial No. 152,844 and thus will not be described in any further detail herein.

To prevent rattling of the bottles within the cartons and the consequent incidental breakage which might result therefrom, spacer tabs 205 are folded upwardly from the bottom 42 of the carton just prior to entry of the bottles into the carton. These tabs exist in the flat carton in the form of U-shaped severance lines 206. As shown in FIGURES 17 and 18, circular cams 207, 208, 209 are located below the main carton conveyor. Each of these cams has spaced protrusions 211 located on its periphery and engageable with the flat tabs 205 as defined by the severance lines 206 to fold the tabs inwardly into the carton. The cams 208 and 209 are nonrotatably mounted upon a transversely extending shaft 215. The cam 207 is located upon a second transversely extending shaft 216 spaced forwardly from the shaft 215. Each of these shafts is driven from the main drive shaft 94 by a linkage system (not shown). Thus the rotation of the cams is synchronized with the movement of the main carton transport conveyor. In the raised position, the tabs 205 act as spacers to prevent engagement between the bottles and thus reduce the possibility of accidental breakage which might otherwise result from rough handling of the cartons.

FLAP HANDLING AND SEALING MECHANISM

Prior to the time that the bottles are inserted into the cartons, the top flaps are forced upwardly into a raised position and the bottom flaps are forced downwardly out of the way so as to permit smooth and unobstructed entry of the bottles into the cartons. The flaps are forced into these positions by plows which for purposes of clarity have not been shown on the drawings. These plows are identical to those illustrated and described in detail in our co-pending application of which this application is a continuation-in-part. After the cartons have been filled with bottles, the sides of the carton must be closed and glued. For this purpose the top flaps and bottom flaps are folded upwardly and downwardly respectively. The front side flaps and the rear side flaps are then folded inwardly toward the bottles and glue is applied from a roller to the corners. Thereafter the top and bottom flaps are folded downwardly and upwardly respectively over the front and rear side flaps to cover the area which had glue applied thereto. The flaps are held together under pressure as the filled and sealed carton progresses along the main carton transport conveyor and out of the machine.

Referring to FIGURES 3 and 15, it will be seen that a pair of top flap folding plows 252 and a pair of bottom flap folding plows 254 are mounted upon two vertical supports 256 on opposite sides of the main carton transport conveyor 90. The top and bottom folding plows extend parallel to the direction of movement of the main transport conveyor in a position immediately adjacent to the sides so that the plows engage the outwardly extending top and bottom side flaps of the cartons as they pass down the conveyor. The ends 258 of the top flap folding plows 252 nearest the infeed end of the machine extend downwardly (as shown in FIGURE 3) and outwardly (shown in phantom in FIGURE 15) in order that the plows will pick up any top flap which might happen to extend downwardly out of the horizontal plane. The bottom flap folding plows 254 merely hold the downwardly folded bottom side flaps in the downwardly folded position as the cartons move along the machine past these plows.

Also mounted upon the vertically extending supports 256 at a point midway between the top flap folding plows 252 and the bottom flap folding plows 254 are a pair of side flap control strips 260. The rear edges of the control strips 260 engage the front surface of the outwardly extending front side flaps of the cartons as they are fed along the main carton transport conveyor and hold these flaps folded inwardly.

The outwardly extending rear side flaps are also folded inwardly after the bottles have been placed in the carton by rear flap folding mechanisms 262 (FIGURE 15) mounted on opposite sides of the main carton transport conveyor at a point immediately in front of the ends of the bucket conveyor and to the rear of the side flap control strips 260.

Each of these rear side flap folding mechanisms consist of two endless chains 264, 266 which are mounted in parallel horizontal planes. Each of these chains has two flap engaging folding fingers 268 extending outwardly therefrom in a position to engage the rear flaps and push them inwardly toward the bottles in the cartons. The flap engaging fingers 268 on the upper chains 264 are located in the same horizontal plane as the upper corners of the cartons on the main carton transport conveyor while the fingers on the lower chains 266 are located in the horizontal plane of the lower corners of the cartons on this conveyor. Each of the fingers 268 on the upper conveyor are located in the same vertical plane as one of the fingers on the lower chain so that the two rear flap closing fingers simultaneously engage the upper and lower corners of the rear flaps.

The upper and lower chains of each rear flap folding mechanism 262 are driven from a pair of sprockets 270 which are keyed or otherwise drivingly connected to a vertical shaft 272. The shafts 272 are rotatably mounted in brackets 274 and each shaft 272 has a bevel gear (not shown) connected to its lower end. In the rear, the upper and lower chains of each rear flap folding mechanism are supported by sprockets 276 which are mounted upon an idler shaft 278. The idler shafts 278 both extend vertically upward from supporting brackets 280 which are fixedly mounted upon the frame 82.

The beveled gears (not shown) on the vertical driving shafts 272 of both rear flap folding mechanisms are driven by a pair of spaced bevel gears (not shown) on shaft 282. At the end, drive shaft 282 has a driving sprocket 286 nonrotatably mounted thereon. The sprocket 286 is driven by a chain 288 and sprocket 290 which receives its drive from main drive shaft 94 through bevel gears 234. Since the rear flap folding mechanisms 262 are driven from the same drive shaft 94 which drives the main carton conveyor, the folding mechanisms are synchronized with the shaft and conveyor.

The gear ratios between the conveyor drive shaft 224 and the rear flap folding mechanism 262 is such that the rear flap folding fingers 268 travel a greater distance per cycle than the cartons on the main carton transport conveyor. Thus, for example, if the cartons travel ten inches per cycle, the rear flap folding fingers 268 should travel approximately twelve inches per cycle so that the fingers will come around the rear sprocket 276 and engage the outwardly extending rear side flaps from the back and as the carton continues moving down the conveyor, the fingers will push the flaps inwardly to a position normal to the rear of the carton before the carton has passed through one cycle or has moved ten inches. In order to accomplish this, it is necessary that the flap engaging fingers move at a faster rate than the cartons. After the rear side flaps have been forced inwardly by the rear flap closing mechanisms they pass between the side flap control strips 260 and are held in the closed position by these strips.

With the top and bottom flaps of the cartons held upwardly by the top and bottom folding plows 252 and 254 and the front side flaps and rear side flaps folded inwardly and held in this position by the strips 260, glue is applied to the tops and bottoms of the front side flaps and rear side flaps in the areas which will be covered by the top side flaps and bottom side flaps when the carton is finally closed. The glue applicators consist of a pair of conventional glue spot application rollers 292 mounted upon the frame 82 for rotation about a vertical axis. The glue application rollers are supported for rotation at a point approximately midway in their length by a section of the frame 82 and at the top by two brackets 296 which are mounted upon vertical posts 298. The peripheral surfaces of the rollers 32 have liquid glue placed thereon by a conventional glue applicator (not shown). Wiper blades (not shown) are mounted upon each of the posts 298 and engage the peripheral surfaces of the rollers 292 to wipe off any excess glue which flows into glue overflow troughs 300 on each of the rollers. As best illustrated in FIGURE 12, the glue rollers 292 each have a worm gear 302 drivingly connected to the lower end which meshes with and is driven by worm gears 304 mounted upon horizontal drive shafts 306 and 308. The shafts 306 and 308 are driven by conventional chain and sprocket drives 310 and 312 respectively from the main drive shaft 94 through the shaft 232.

After glue is applied to the front and rear side flaps, the top and bottom side flaps are folded downwardly and upwardly respectively over the front and rear side flaps to seal the cartons. The mechanism for folding the top and bottom side flaps downwardly and upwardly respectively is identical to that disclosed in application Serial No. 152,844 and therefore has not been shown in the drawings.

As the cartons are carried forward on the main transport conveyor with the front and rear side flaps folded inwardly and the top and bottom side flaps folded inwardly over the tops of the front and bottom side flaps in the area to which glue has been applied, the flaps are held in the closed position by the holding strips 330, 332 long enough for the glue on the front and rear side flaps to dry and seal the side flaps in the closed positions.

As the advancing cartons approach the end of the main carton transport conveyor, a set of speed belts 40 (FIGURES 4 and 8) mounted on opposite sides of the main transport conveyor frictionally engage the sides of the cartons and pull them off of the main transport conveyor. The purpose of these speed belts is to eliminate the possibility of the spacer lugs 88, on the main transport conveyor puncturing the rear side walls of the cartons as the spacer lugs travel around the driving sprockets 98. During the period when the spacer lugs are traveling around the sprockets 98, the linear velocity of the outside edge of the lugs is increased and there is a tendency for the outer edge surface to puncture the rear wall of the carton if the cartons are not moved away or pulled out of the machine in front of the lugs.

The speed belt arrangement 40 consists of a pair of belts 314 mounted upon each side of the conveyor and supported between a pair of driving pulleys 316 and a pair of driven pulleys 318. The driving pulleys 316 are keyed to a driven shaft 320 which is rotatably mounted in a supporting bracket 322 connected to the frame of the machine. The driven pulleys are supported upon vertical idler shafts 324 which are also mounted in the brackets 322.

Journalled in the brackets 322 is a horizontal drive shaft 326 which has a pair of spaced beveled gears 328 mounted thereon. These gears drive a pair of beveled gears on the shafts 320. The speed belt driving shaft 326 is driven by a chain and sprocket drive (not shown) from the main drive shaft 94.

It will be understood that the above detailed description is made by way of illustration and not limitation, it being contemplated that any modification of details of the invention may be made without departing from the scope of the appended claims.

Having described our invention, we claim:

1. Apparatus for segregating articles into groups comprising,
   article conveyor means operable to move said articles in a continuous line toward an article handling station,
   means for moving said conveyor at a first rate of speed,
   a plurality of restraining finger means movable parallel with said article conveyor at a slower rate of speed,
   cam means for moving said fingers laterally into a restraining position in front of a predetermined number of said articles as said fingers and said articles move toward said article handling station, whereby said fingers engage and restrain the movement of said continuous line of articles, and
   cam means for sequentially moving said fingers out of engagement with said articles whereby said predetermined number of articles released by the withdrawn fingers move at said first rate of speed on said conveyor and a gap is established between the restrained articles and the unrestrained articles.

2. Apparatus for segregating articles into groups comprising,
   article conveyor means operable to move said articles in a continuous line toward an article handling station,
   means for moving said conveyor at a first rate of speed,
   a plurality of restraining finger means movable parallel with said article conveyor at a slower rate of speed,
   cam means for sequentially pivoting said fingers laterally into a restraining position in front of a predetermined number of said articles as said fingers and said articles move toward said article handling station, whereby said fingers engage and restrain the movement of said continuous line of articles, and
   cam means for sequentially pivoting said fingers out of engagement with said articles whereby said predetermined number of articles released by the withdrawn fingers move at said first rate of speed on said conveyor and a gap is established between the restrained articles and the unrestrained articles.

3. A cartoning machine for packing articles into cartons comprising,
   magazine means for storing said cartons in a flat folded condition,
   means for feeding said folded cartons sequentially from said magazine,
   means for continuously moving said cartons in a path of travel after they are fed from said magazine,
   means for erecting said cartons as they are transported on said continuous moving means,
   conveyor means for continuously moving said articles in a continuous line toward an article packing station,
   means for moving said conveyor at a first rate of speed,
   a plurality of restraining members movable parallel with said article conveyor at a slower rate of speed,
   means for moving said members laterally into a restraining position in front of a predetermined number of said articles as said members and said articles move toward said article handling station whereby said members engage and restrain the movement of said continuous line of articles,
   means for sequentially moving said members out of engagement with said articles whereby said predetermined number of articles released by the withdrawn members move as a group at said first rate of speed on said conveyor and a gap is established between the restrained articles and the unrestrained articles.
   means for moving said groups of articles into an open side of said cartons, and means for sealing said cartons as said cartons move away from said packing station.

4. A cartoning machine for packing articles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, conveyor means for continuously moving said articles in a continuous line toward an article packing station, means for moving said conveyor at a first rate of speed, a plurality of restraining members movable parallel with said article conveyor at a slower rate of speed, cam means for moving said members laterally into a restraining position in front of a predetermined number of said articles as said members and said articles move toward said article handling station whereby said members engage and restrain the movement of said continuous line of articles, cam means for sequentially moving said members out of engagement with said articles whereby said predetermined number of articles released by the withdrawn members move as a group at said first rate of speed on said conveyor and a gap is established between the restrained articles and the unrestrained articles, means for moving said groups of articles into an open side of said cartons, and means for sealing said cartons as said cartons move away from said packing station.

5. A cartoning machine for packing articles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, conveyor means for continuously moving said articles in a continuous line toward an article packing station, means for moving said conveyor at a first rate of speed, a plurality of restraining members movable parallel with said article conveyor at a slower rate of speed, cam means for pivoting said members laterally into a restraining position in front of a predetermined number of said articles as said members and said articles move toward said article handling station whereby said members engage and restrain the movement of said continuous line of articles, cam means for sequentially pivoting said members out of engagement with said articles whereby said predetermined number of articles released by the withdrawn members move as a group at said first rate of speed on said conveyor and a gap is established between the restrained articles and the unrestrained articles, means for moving said groups of articles into an open side of said cartons, and means for sealing said cartons as said cartons move away from said packing station.

6. A cartoning machine for packing articles into cartons comprising, magazine means for storing said cartons in a flat folded condition, means for feeding said folded carton sequentially from said magazine, means for continuously moving said cartons in a path of travel after they are fed from said magazine, means for erecting said cartons as they are transported on said continuous moving means, conveyor means for continuously moving said articles in a continuous line toward an article packing station, means for moving said conveyor at a first rate of speed, a plurality of restraining members movable parallel with said article conveyor on an endless conveyor at a slower rate of speed, cam means for pivoting said members laterally into a restraining position in front of a predetermined number of said articles as said members and said articles move toward said article handling station whereby said members engage and restrain the movement of said continuous line of articles, cam means for sequentially pivoting said members out of engagement with said articles whereby said predetermined number of articles released by the withdrawn members move as a group at said first rate of speed on said conveyor and a gap is established between the restrained articles and the unrestrained articles, separator finger means movable into said gap to maintain the spacing between said groups, means for moving said groups of articles into an open side of said cartons, and means for sealing said cartons at said cartons move away from said packing station.

7. A cartoning machine for packing articles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, conveyor means for continuously moving said articles in a continuous line toward an article packing station, a plurality of spacer fingers movable on an endless conveyor parallel with said article conveyor, cam means for moving said fingers laterally into a restraining position over said conveyor in front of a predetermined number of said articles as said fingers and said articles move toward said article handling station whereby said fingers engage and separate said articles into groups of said predetermined number, means for moving said groups of articles into an open side of said cartons, and means for sealing said cartons as said cartons move away from said packing station.

8. A cartoning machine for packing bottles into cartons comprising, magazine means for storing said cartons in a flat folded condition, means for feeding said folded carton sequentially from said magazine, means for continuously moving said cartons in a path of travel after they are fed from said magazine, means for erecting said cartons as they are transported on said continuous moving means, a pair of conveyors located on opposite sides of said carton moving means for continuously moving said bottles in a pair of continuous lines toward a packing station, means for moving said conveyors at a first rate of speed, a plurality of restraining members movable parallel with said bottle conveyors at a slower rate of speed, means for moving said members laterally into a restraining position in front of a predetermined number of said bottles as said members and said bottles move toward said packing station whereby said members engage and restrain the movement of said continuous line of bottles, means for sequentially moving said members out of engagement with said bottles whereby said predetermined number of bottles released by the withdrawn members move as a group at said first rate of speed on said conveyor and a gap is established between the restrained bottles and the unrestrained bottles, means for moving said groups of bottles into an open side of said cartons, and means for sealing said cartons as said cartons move away from said packing station.

9. A cartoning machine for packing bottles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, a pair of conveyors located on opposite sides of said carton moving means for continuously moving said bottles in a pair of continuous lines toward a packing station, means for moving said conveyors at a first rate of speed, a plurality of restraining members movable parallel with said bottle conveyors at a slower rate of speed, means for moving said members laterally into a restraining position in front of a predetermined number of said bottles as said members and said bottles move toward said packing station whereby said members engage and restrain the movement of said continuous line of bottles, means for sequentially moving said members out of engagement with said bottles whereby said predetermined number of bottles released by the withdrawn members move as a group at said first rate of speed on said conveyor and a gap is established between the restrained bottles and the unrestrained bottles, separator finger means movable into said gap to maintain the spacing between said groups, means for moving said groups of bottles into an open side of said cartons, and means for sealing said cartons as said cartons move away from said packing station.

10. A cartoning machine for packing bottles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, a pair of conveyors located on opposite sides of said carton moving means for continuously moving said bottles in a pair of continuous lines toward a packing station, a plurality of spacer fingers movable on endless conveyors parallel with said bottle conveyors, cam means for moving said fingers laterally into a position in front of a predetermined number of said bottles as said fingers and said bottles move toward said packing station whereby said fingers engage and separate said continuous line of bottles into groups, means for moving said groups of bottles into an open side of said cartons, and means for sealing said cartons as said cartons move away from said packing station.

11. A cartoning machine for packing bottles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, a pair of conveyors located on opposite sides of said carton moving means for continuously moving said bottles in a pair of continuous lines toward a packing station, means for moving said conveyors at a first rate of speed, a plurality of restraining members mounted upon endless conveyors movable parallel with said bottle conveyors at a slower rate of speed, cam means for moving said members laterally into a restraining position in front of a predetermined number of said bottles as said members and said bottles move toward said packing station whereby said members engage and restrain the movement of said continuous line of bottles, means for sequentially moving said members out of engagement with said bottles whereby said predetermined number of bottles released by the withdrawn members move as a group at said first rate of speed on said conveyor and a gap is established between the restrained bottles and the unrestrained bottles, means for moving said groups of bottles into an open side of said cartons, and means for sealing said cartons as said cartons move away from packing station.

12. A cartoning machine for packing articles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, a pair of conveyors located on opposite sides of said carton moving means for continuously moving said articles in a pair of continuous lines toward a packing station, means for moving said conveyors at a first rate of speed, a plurality of restraining members movable parallel with said article conveyors at a slower rate of speed, means for moving said members laterally into a restraining position in front of a predetermined number of said articles as said members and said articles move toward said packing station whereby said members engage and restrain the movement of said continuous line of articles, means for sequentially moving said members out of engagement with said articles whereby said predetermined number of articles released by the withdrawn members move as a group at said first rate of speed on said conveyor and a gap is established between the restrained articles and the unrestrained articles, means for moving said groups of articles into an open side of said cartons, and means for sealing said cartons as said cartons move away from said packing station.

13. A cartoning machine for packing articles into cartons, comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, a pair of conveyors located on opposite sides of said carton moving means for continuously moving said articles in a pair of continuous lines toward a packing station, means for moving said conveyors at a first rate of speed, a plurality of restraining members movable parallel with said article conveyors at a slower rate of speed, means for moving said members laterally into a restraining position in front of a predetermined number of said articles as said members and said articles move toward said packing station whereby said members engage and restrain the movement of said continuous line of articles, means for sequentially moving said members out of engagement with said bottles whereby said predetermined number of articles released by the withdrawn members move as a group at said first rate of speed on said conveyor and a gap is established between the restrained articles and the unrestrained articles, separator finger means movable into said gap to maintain the spacing between said groups, means for moving said groups of articles into an open side of said cartons, and means for sealing said cartons as said cartons move away from said packing station.

14. A cartoning machine for packing articles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, a pair of conveyors located on opposite sides of said carton moving means for continuously moving said articles in a pair of continuous lines toward a packing station, a plurality of spacer fingers movable on endless conveyors parallel with said bottle conveyors, cam means for moving said fingers laterally into a position in front of a predetermined number of said articles as said fingers and said articles move toward said packing station whereby said fingers engage and separate said continuous line of articles into groups, means for moving said groups of articles into an open side of said cartons, and means for sealing said cartons as said cartons move away from said packing station.

15. A cartoning machine for packing articles into cartons comprising, magazine means for storing said cartons in a flat folded condition, means for feeding said folded cartons sequentially from said magazine, means for continuously moving said cartons in a path of travel after they are fed from said magazine, means for erecting said cartons as they are transported on said continuous moving means, a pair of conveyors located on opposite sides of said carton moving means for continuously moving said articles in a pair of continuous lines toward a packing station, means for moving said conveyors at a first rate of speed, a plurality of restraining members mounted upon endless conveyors movable parallel with said bottle conveyors at a slower rate of speed, cam means for moving said members laterally into a restraining position in front of a predetermined number of said articles as said members and said articles move toward said packing station whereby said members engage and restrain the movement of said continuous line of articles, means for sequentially moving said members out of engagement with said articles whereby said predetermined number of articles released by the withdrawn members move as a group at said first rate of speed on said conveyor and a gap is established between the restrained articles and the unrestrained articles, means for moving said groups of articles into an open side of said cartons, and means for sealing said cartons as said cartons move away from said packing station.

References Cited by the Examiner
UNITED STATES PATENTS

| | | | |
|---|---|---|---|
| 2,805,755 | 9/1957 | Jones | 198—34 |
| 3,083,510 | 4/1963 | Ganz | 53—48 |

GRANVILLE Y. CUSTER, JR., *Primary Examiner.*

TRAVIS S. McGEHEE, FRANK E. BAILEY,
*Examiners.*